United States Patent
Xu et al.

(10) Patent No.: US 7,782,022 B2
(45) Date of Patent: Aug. 24, 2010

(54) INPUT SOURCE DETECTION FOR A BATTERY CHARGER

(75) Inventors: Zhenxue Xu, Murphy, TX (US); Byron Reed, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

(21) Appl. No.: 11/975,617

(22) Filed: Oct. 19, 2007

(65) Prior Publication Data

US 2009/0102429 A1 Apr. 23, 2009

(51) Int. Cl.
*H02J 7/06* (2006.01)
*H02J 7/24* (2006.01)

(52) U.S. Cl. ........................ 320/164; 320/162

(58) Field of Classification Search .......... 320/145, 320/152, 157–159, 162–164
See application file for complete search history.

(56) References Cited

U.S. PATENT DOCUMENTS 6,452,364 B1 * 9/2002 Saeki et al. ............ 320/137
2008/0258688 A1 * 10/2008 Hussain et al. ......... 320/145

OTHER PUBLICATIONS

Battery Charging Specification—Revision 1.0; Mar. 8, 2007.
On-The-Go Supplement to the USB 2.0 Specification—Revision 1.3; Dec. 5, 2006.
Universal Serial Bus Specification—Revision 2.0; Apr. 27, 2000.

* cited by examiner

*Primary Examiner*—Edward Tso
*Assistant Examiner*—Ramy Ramadan
(74) *Attorney, Agent, or Firm*—William B. Kempler; Wade J. Brady, III; Frederick J. Telecky, Jr.

(57) ABSTRACT

A system and method for determining if a USB port can source sufficient current to charge a rechargeable battery at a predetermined peak current level. Detection circuitry is disposed between the USB port and the battery. The detection circuitry includes a current source that is controlled to provide to the battery an increasing current that is sourced by the USB port. As the source current is increased from an initial value to a predetermined peak current source value, the output voltage of the USB port is monitored. If the USB port output voltage drops below a specified threshold voltage before the current source has ramped to the peak current source value, the load current is removed from the battery and an indication is provided that the USB port cannot provide the specified current. The detection process is then repeated after a specified delay interval. If the current source ramps up to the peak source current value and the USB port voltage has not decreased below the specified threshold voltage, charging of the rechargeable battery from the USB port continues at the peak source current.

17 Claims, 3 Drawing Sheets

US 7,782,022 B2

INPUT SOURCE DETECTION FOR A BATTERY CHARGER

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to battery chargers and more specifically to a system and method for verifying that a USB port has sufficient power to charge a rechargeable battery at a predetermined source current level while maintaining a minimum specified output voltage.

USB ports are provided in most presently manufactured desktop and laptop computers and are commonly used to interface peripheral devices to such computers. Due to the ubiquitous nature of USB ports in a computing environment, it is desirable to utilize such ports as a power source for the charging of rechargeable batteries. However, prior to the coupling of the USB port to a rechargeable battery it is desirable to verify that the specific USB port being used has sufficient power that to charge the rechargeable battery while avoiding possible avoid damage that to USB port circuitry.

Other solutions to this problem rely on the USB controller to identify the USB type by a complex data evaluation process. It would therefore be desirable to have a simple, effective and reliable technique for verifying that the USB port to be utilized in the battery charging process has sufficient power prior to the initiation of charging.

BRIEF SUMMARY OF THE INVENTION

In accordance with the present invention a system and method is disclosed for verifying that a power source, such as a USB port, has sufficient power to charge a rechargeable battery. A controller is coupled to the USB port and to the rechargeable battery. The controller controls the application of source current from the USB port to the rechargeable battery by ramping the source current from the USB port in a controlled manner until the source current reaches a predetermined peak source current. While ramping the source current, the controller monitors the USB port output voltage. In the event the USB port output voltage decreases to a specified threshold voltage $V_{IN(MIN)}$ before the source current reaches the predetermined peak source current, the source current is disconnected from the rechargeable battery so as to discontinue the charging process since the decrease of the USB port output voltage indicates that the port is in a suspended state or has insufficient power to charge the battery. After removal of the source current from the rechargeable battery and after a predetermined delay interval, the controller repeats the above-described detection process. If the USB port output voltage does not decrease to the minimum specified threshold voltage Vin(min) by the time the source current reaches the predetermined peak source current, the controller permits the peak source current to continue to be provided from the power source to the rechargeable battery.

BRIEF DESCRIPTION OF THE SEVERAL VIEWS OF THE DRAWINGS

The present invention will be more fully understood by reference to the following Detailed Description of the Invention in conjunction with the drawings of which.

DETAILED DESCRIPTION OF THE INVENTION

In accordance with the present invention, a method and system are disclosed for verifying that a USB port can source a predetermined peak source current without causing the USB output port voltage to drop below a predetermined minimum threshold voltage. The presently disclosed method and system are described below with reference to FIGS. 1-5.

Figure 1:
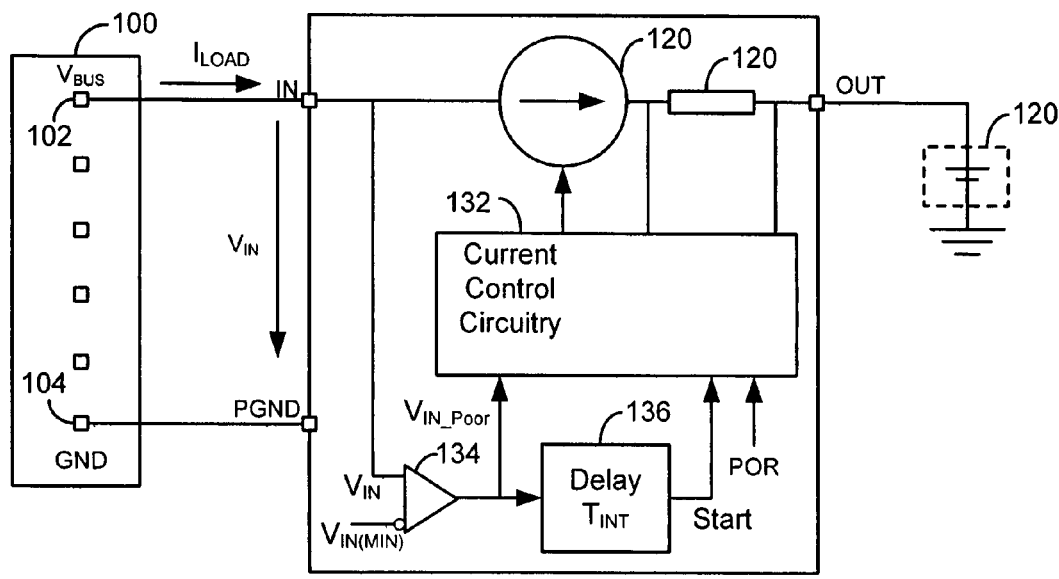
FIG. 1 is a block diagram depicting a system for performing input power source detection in accordance with the present invention that is disposed between a USB power source and a rechargeable battery.

Referring to FIG. 1, a Universal Serial Bus (USB) port 100 includes a voltage output $V_{BUS}$ 102 and a ground connection 104 and produces a USB port output voltage therebetween. The signals $V_{BUS}$ and GND are coupled to a controller that includes input power source detection circuitry 110 which is disposed between the USB port 100 and a rechargeable battery 120. The detection circuitry 110 controls the application of charging current to the rechargeable battery 120 as described in greater detail below.

Figure 4:
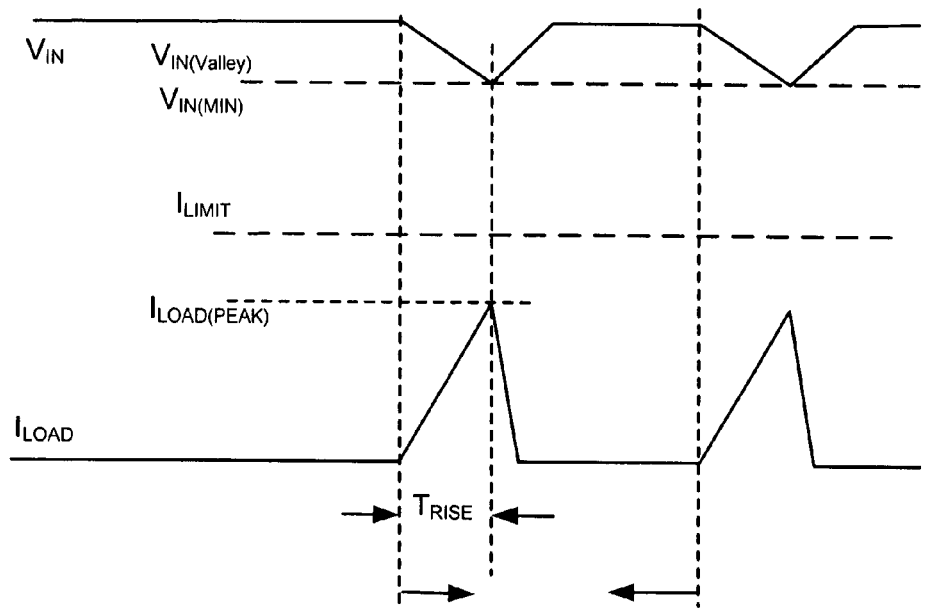
FIG. 4 is a timing diagram depicting the timing in the system of FIG. 1 in which the USB output port cannot maintain the USB output port voltage above the minimum threshold voltage $V_{IN(MIN)}$ while sourcing current up to a predetermined peak source current.

In response to a power on reset (POR) signal, the detection circuitry 110 loads a register (not shown) with a value that corresponds to a peak charging current $I_{LOAd(PEAK)}$. The peak charging current is the maximum current that is to be utilized for the charging of the rechargeable battery 120. The signal $V_{BUS}$ is coupled to a current source 130 within the detection circuitry 110. The current source 130 is controlled so as to ramp the charging current provided by the output port and applied to the rechargeable battery 110 during an interval $T_{RISE}$ from an initial charging current, such as 0 milliamps, to a final charging current which corresponds to the peak charging current $I_{LOAd(PEAK)}$ as illustrated in the lower portion of FIG. 3. The charging current may be controlled by current source control circuitry 132 so as to increase linearly at a specified slew rate or in a non-linear manner from the initial charging current to the peak charging current. While the charging current is increasing, the USB port output voltage ($V_{IN}$ to the detection circuitry 110) is monitored using a comparator 134. In the event the charging current has increased from the initial charging current to the peak charging current $I_{LOAD(PEAK)}$ and the comparator 134 indicates that the USB port output voltage $V_{IN}$ to the detection circuitry 110 has not decreased below a predetermined minimum value $V_{IN(MIN)}$, the detection circuitry 110 permits the USB output port to continue to source the peak charging current to the rechargeable battery 120 to continue to charge the battery. In the event the comparator 134 determines that the USB port output voltage $V_{IN}$ has dropped below the predetermined minimum threshold voltage $V_{IN(MIN)}$ during the interval when the charging current is increasing from the initial charging current toward the peak charging current as depicted in FIG. 4, the detection circuitry 110 controls the current source 130 so as to cease the charging of the rechargeable battery 120. More specifically, the comparator 134, in response to a determination that the USB port output voltage $V_{IN}$ has dropped below the predetermined minimum threshold voltage $V_{IN(MIN)}$, generates a signal $V_{IN\_POOR}$ which is coupled to current source control circuitry 132, which in turn causes the current source to cease sourcing current to the rechargeable battery 120.

The comparator 134 output is also coupled to delay circuitry 136. In the event the comparator 134 generates the signal $V_{IN\_POOR}$ indicating that the USB port output voltage $V_{IN}$ has dropped below the minimum threshold voltage $V_{IN(MIN)}$, the delay circuitry 136 generates a delay of length $T_{INT}$, following which the delay circuitry 136 generates a Start signal which is coupled to the current source control circuitry 132. In response to the Start signal, the current source control circuitry 132 controls the current source 130 to restart charging of the battery 120 by ramping the charge current, as previously discussed, from the initial charging current toward the peak charging current while monitoring the USB port output voltage $V_{IN}$ to verify that such voltage does not drop below the predetermined minimum threshold voltage $V_{IN(MIN)}$ as illustrated in FIG. 4.

The current source 130 employed in the detection circuitry 110 may be implemented using a pulse width modulator (PWM) in which case the current control circuitry 132 includes the circuitry to provide appropriate pulse width modulation to generate the proper current as the source current is ramped from the initial charging current to the peak charging current. In this regard, a current sensing resistor 138 may be provided in series between the current source and the rechargeable battery to provide an indication to the current control circuitry 132 of the current supplied by the current source.

Figure 2A:
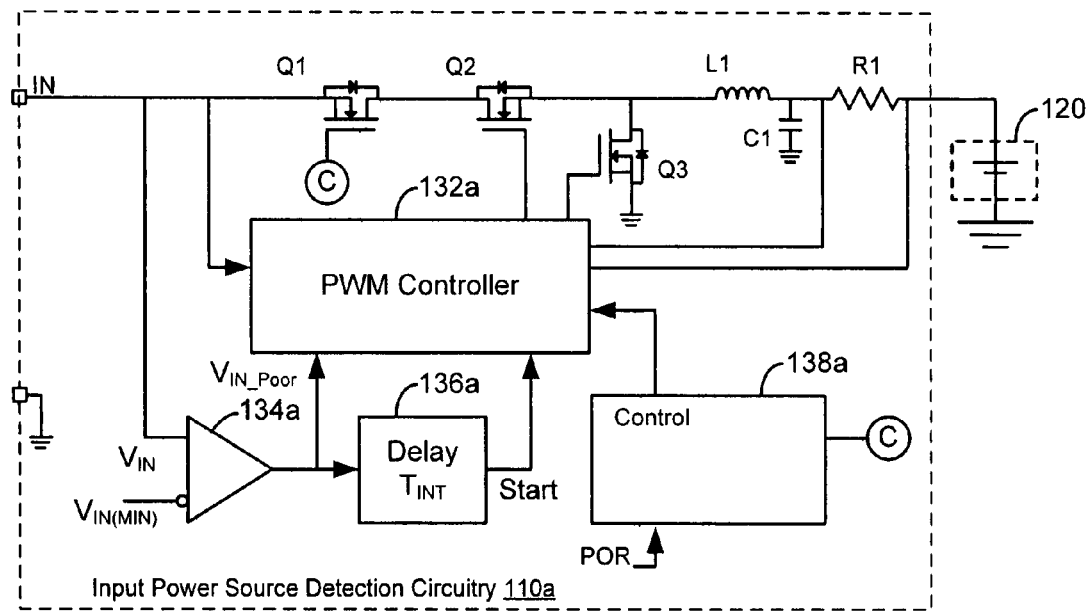
FIG. 2a is a more detailed block diagram of a first exemplary embodiment of input power source detection circuitry employing a PWM current source for use in the system of FIG. 1.

A more detailed block diagram illustrating input power source detection circuitry 110a that employs pulse width modulation for control of the source current is depicted in FIG. 2a. The circuitry 110a includes a PWM controller 132a that generates control signals for switching transistors Q1 and Q3. The detection circuitry 110 includes a comparator 134a and delay circuitry 136a that functions as discussed above with respect to FIG. 1. The detection circuitry 110a also includes a transistor Q1 that is controlled so as to provide a very low drain source resistance when forward biased and a very high drain source resistance with back biased so as to avoid damage to the USB port in a back biased state in which the rechargeable battery 120 voltage exceeds the USB port output voltage. The POR signal is coupled to control circuitry 138a which activates the loading of the register with the value corresponding to the peak source current and initiates the application of source current to the battery 120.

The output from the PWM switching transistors Q2 and Q3 represents a signal that is generally a pulse width modulated waveform. This signal is coupled to an inductor-capacitor filter L1-C1 to provide DC smoothing. The output of the inductor-capacitor filter is coupled to one end of a sense resistor R! and the other end of the sense resistor R1 is coupled to the rechargeable battery 120. Connections on either end of the sense resistor R! are fed back to the controller 132a to provide an indication of the charging current to the PWM control circuitry 132a.

Figure 2B:
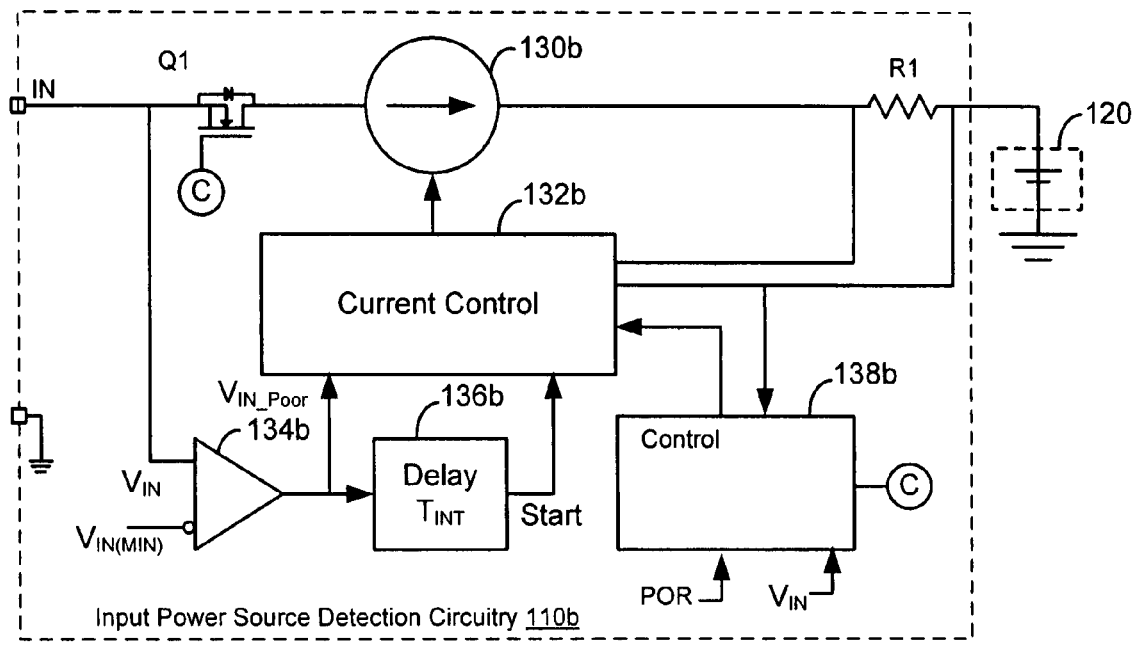
FIG. 2b is a block diagram of a second exemplary embodiment of input power source detection circuitry employing a linear current source for use in the system of FIG. 1 that is operative in accordance with the present invention.
Figure 3:
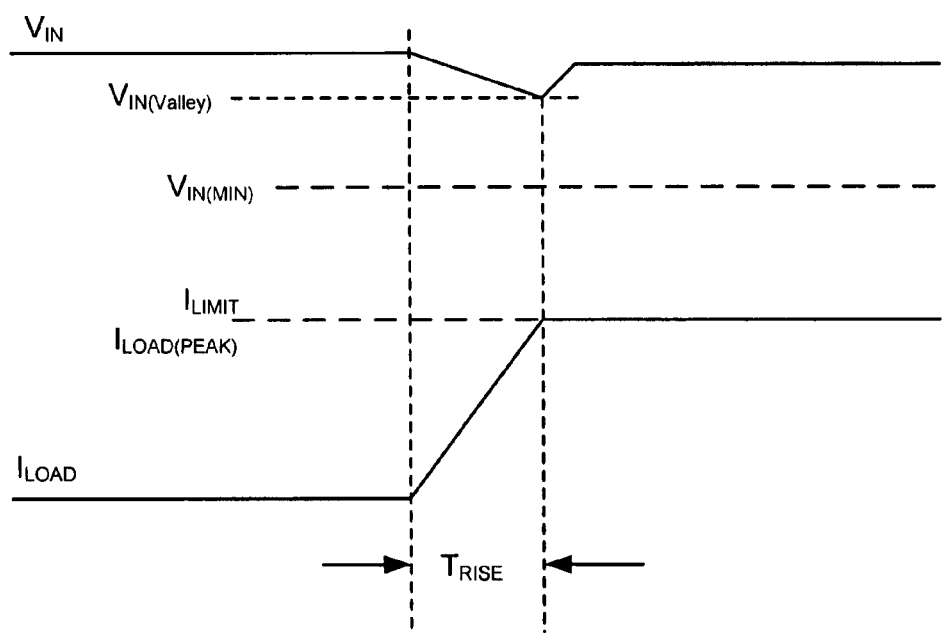
FIG. 3 is a timing diagram depicting the timing in the system of FIG. 1 in which the USB port can source a predetermined peak source current while maintaining the USB output voltage above a minimum threshold voltage $V_{IN(MIN)}$.

In another embodiment illustrated in FIG. 2b, a voltage or current controlled linear current source is employed to generate the charging current is conveyed to the rechargeable battery 120. More specifically, a linear current source employing a bipolar of field effect transistor 130b provides the charging current to the rechargeable battery 120. The transistor 130b is controlled by current control circuitry 132b generally as discussed hereinabove with respect to FIG. 1 to accomplish the timing and objectives discussed in connection with FIG. 1 and depicted in FIGS. 3 and 4. The operation of the comparator 134b, the delay circuitry 136, transistor Q1 and control circuitry 138b are generally as discussed above in connection with FIGS. 1 and 2a.

Figure 5:
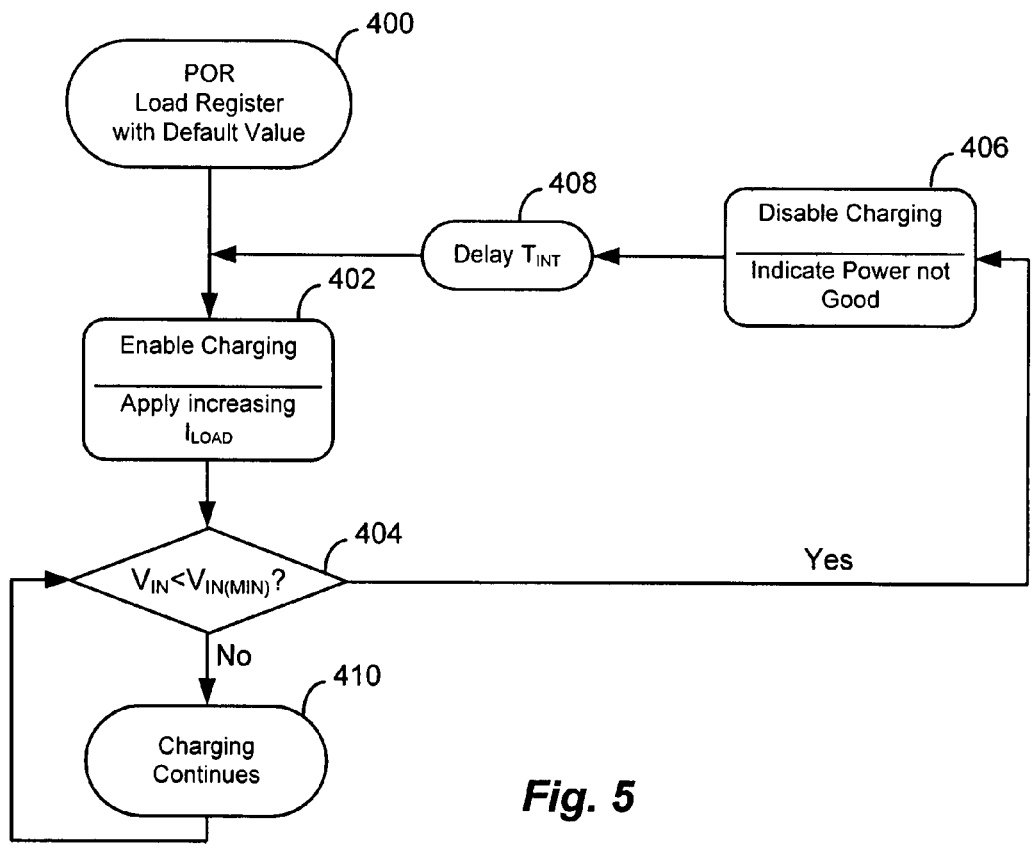
FIG. 5 is a flow chart illustrating a method of operation in accordance with the present invention.

A method of operation in accordance with the presently disclosed invention is depicted in FIG. 5. Referring to FIG. 5, in response to a power on reset (POR) signal, a default value for the peak charging current is loaded into a register as illustrated at step 400. As shown at step 402, detection circuitry 110 (FIG. 1) enables charging of the rechargeable battery 120 by applying a charging current that is increasing at a controlled rate. The charging current may be controlled to increase linearly or non-linearly. During the application of the increasing charging current to the rechargeable battery 120, the USB port output voltage is monitored as illustrated at step 404. If the USB port output voltage decreases below a predetermined threshold voltage $V_{IN(MIN)}$, as depicted in step 406, the detection circuitry 110 disables charging of the rechargeable battery 120 and provides an indication that the USB output port cannot adequately source the required charging current. Following the disabling of charging of the rechargeable battery 120, the detection circuitry 110 delays for a time interval $T_{INT}$ and then re-initiates charging of the rechargeable battery 120 as discussed in connection with step 402 and continues monitoring of the USB port output voltage as discussed in connection with decision step 404 to determine if the USB port output voltage $V_{IN}$ drops below the specified minimum threshold voltage $V_{IN(MIN)}$.

If the USB port output voltage does not decrease below the minimum threshold voltage $V_{IN(MIN)}$, the charging current supplied by the USB port continues to increase until the charging current reaches of the current $I_{LOAD(PEAK)}$ which corresponds to the maximum charging current specified by the stored value within the register. Once the charging current reaches the peak charging current $I_{LOAD(PEAK)}$, the detection circuitry 110 continues to source charging current from the USB port at the peak charging current. More specifically, if the charging current applied to the rechargeable battery 120 by the detection circuitry 110 reaches the peak charging current and the USB output port voltage has not decreased below a predetermined threshold voltage VIN(MIN) charging of the rechargeable battery continues at the peak charging current as illustrated in step 410.

While the above-described system and method are discussed in terms of a Universal Serial Bus (USB) output port, it should be understood that the presently described detection circuitry and system may be employed with any power source that is employed to charge a rechargeable battery. It will be further apparent to those of ordinary skill in the art that modifications to and variations of the above-described system and method may be made without departing from the inventive concepts disclosed herein. Accordingly, the invention should not be viewed as limited except by the scope and spirit of the appended claims.

What is claimed is:

1. A method for determining in detection circuitry disposed between a power source and a rechargeable battery whether the power source can source a predetermined peak charging current to charge the rechargeable battery, wherein the power source has an output voltage, the method comprising the steps of:

in a first controlling step, controlling, in the detection circuitry, the application of a charging current sourced by the power source and provided to the rechargeable battery so that the charging current increases from an initial charging current toward said peak charging current in a predetermined manner;

monitoring the power source output voltage to determine whether the power source output voltage decreases below a predetermined threshold voltage as said charging current increases from said initial charging current toward said peak charging current;

in the event the charging current reaches the peak charging current and said monitoring step has not produced an indication that said power source output voltage has dropped below said predetermined threshold voltage, in a second controlling step, controlling, in the detection circuitry, the sourcing of charging current from said power source to said rechargeable battery at said peak charging current; and in the event the monitoring step results in an indication that said power source output voltage has dropped below said predetermined threshold voltage before said charging current has reached said peak charging current, in a third controlling step, controlling said detection circuitry so as to discontinue sourcing of said charging current from said power source to said rechargeable battery.

2. The method of claim 1 wherein said controlling step comprises the step of controlling in the detection circuitry the application of a charging current sourced by a USB port and provided to the rechargeable battery so that the charging current increases from an initial charging current of approximately 0 milliamps toward said peak charging current in a predetermined manner.

3. The method of claim 1 wherein said controlling step comprises the step of controlling in the detection circuitry the application of a charging current sourced by the power source and provided to the rechargeable battery so that the charging current increases from an initial charging current toward said peak charging current in a generally linear manner.

4. The method of claim 1 wherein said controlling step comprises the step of controlling, in the detection circuitry, the application of a charging current sourced by the power source and provided to the rechargeable battery so that the charging current increases from an initial charging current toward said peak charging current in a generally non-linear manner.

5. The method of claim 1 further including the steps of:

generating a delay of a predetermined time interval in the event said monitoring step results in a determination that said power source output voltage has dropped below said predetermined threshold voltage; and following said delay repeating said first controlling step, said monitoring step and said second and third controlling steps, as applicable.

6. The method of claim 1 wherein said first controlling step comprises the step of controlling a pulse width modulator within said detection circuitry to control the application of said charging current sourced by the power source and provided to the rechargeable battery so that the charging current increases from said initial charging current toward said peak charging current in said predetermined manner.

7. The method of claim 1 wherein said first controlling step comprises the step of controlling a linear current source within said detection circuitry to control the application of said charging current sourced by the power source and provided to the rechargeable battery so that the charging current increases from said initial charging current toward said peak charging current in said predetermined manner.

8. The method of claim 1 wherein said power source comprises a Universal Serial Bus (USB) port.

9. Circuitry for coupling between a power source having an output voltage and a rechargeable battery, said circuitry comprising:

an input for coupling to a power connection of said power source and an output for coupling to said rechargeable battery;

a controllable current source disposed between said input and said output;

a controller for controlling via said controllable current source, a charging current sourced from said power connection and provided to said rechargeable battery, said controller operative to control said controllable current source such that said charging current increases from an initial charging current toward a predetermined peak charging current in a predetermined manner;

a comparator operative to provide an indication if said power source output voltage decreases below a predetermined threshold voltage while said charging current is increasing from said initial charging current toward said peak charging current;

said controller, operative in response to an indication from said comparator that said power source output voltage has dropped below said predetermined threshold voltage before said charging current has reached said predetermined peak charging current to control said controllable current source so as to terminate sourcing of charging current from said power source to said rechargeable battery via said controllable current source; and said controller, operative in response to an indication from said comparator that said power source output voltage has not dropped below said predetermined threshold voltage before said charging current has reached said predetermined peak charging current to control said controllable current source so as to continue the sourcing of charging current from said power source to said rechargeable battery via said controllable current source at said peak charging current.

10. The circuitry of claim 9 wherein said initial charging current is approximately 0 milliamps.

11. The circuitry of claim 9 wherein said controller is operative to control said controllable current source so as to increase said charging current in a generally linear manner from said initial charging current toward said peak charging current.

12. The circuitry of claim 9 wherein said controller is operative to control said controllable current source so as to increase said charging current in a generally non-linear manner from said initial charging current toward said peak charging current.

13. The circuitry of claim 9 further including delay circuitry operative to generate a predetermined delay in response to a determination by said comparator that a USB port output voltage has dropped below said predetermined threshold voltage, said control circuitry operative to control said controllable current source to re-initiate charging of said rechargeable battery with a charging current increasing from said initial charging current toward said peak charging current following said predetermined delay.

14. The circuitry of claim 9 wherein said controllable current source includes a pulse width modulator operative to provide said charging current for charging said battery in response to a control input.

15. The circuitry of claim 9 wherein said controllable current source includes a linear current source operative to provide said charging current for charging said battery in response to a control input.

16. The circuitry of claim 9 wherein said power source comprises a Universal Serial Bus (USB) port.

17. A system for determining whether a power source can source a predetermined peak charging current to a rechargeable battery:
   a Universal Serial Bus (USB) output port having a power connection, said output port having an output voltage;
   a rechargeable battery;
   detection circuitry in electrical communication with said USB output port and said rechargeable battery, said detection circuitry including:
      an input for receiving power from said power connection and an output for coupling to said rechargeable battery;
      a controllable current source disposed between said input and said output;
      a controller for controlling, via said controllable current source, a charging current sourced from said power connection and provided to said rechargeable battery, said controller operative to control said controllable current source such that said charging current increases from an initial charging current toward a predetermined peak charging current in a predetermined manner;
      a comparator operative to provide an indication if said USB port output voltage decreases below a predetermined threshold voltage while said charging current is increasing from said initial charging current toward said peak charging current;
      said controller, operative in response to an indication from said comparator that said USB port output voltage has dropped below said predetermined threshold voltage before said charging current has reached said predetermined peak charging current to control said controllable current source so as to terminate sourcing of charging current from said USB port to said rechargeable battery via said controllable current source; and
      said controller, operative in response to an indication from said comparator that said USB port output voltage has not dropped below said predetermined threshold voltage before said charging current has reached said predetermined peak charging current to control said controllable current source so as to continue the sourcing of charging current from said USB port to said rechargeable battery via said controllable current source at said peak charging current.

* * * * *